(12) United States Patent
Kwon et al.

(10) Patent No.: US 11,314,813 B2
(45) Date of Patent: Apr. 26, 2022

(54) APPARATUS FOR GUARANTEEING INTEGRITY OF STATE DATABASE IN BLOCKCHAIN-BASED ENVIRONMENT AND METHOD THEREOF

(71) Applicant: SAMSUNG SDS CO., LTD., Seoul (KR)

(72) Inventors: Young Woon Kwon, Seoul (KR); Sang Jun Kang, Seoul (KR); Jun Tae Kim, Seoul (KR); Young Yoo Heo, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 343 days.

(21) Appl. No.: 16/727,235

(22) Filed: Dec. 26, 2019

(65) Prior Publication Data

US 2020/0364273 A1     Nov. 19, 2020

(30) Foreign Application Priority Data

May 17, 2019   (KR) ........................ 10-2019-0058190

(51) Int. Cl.
*G06F 16/903* (2019.01)
*H04L 9/06* (2006.01)
*G06F 16/23* (2019.01)

(52) U.S. Cl.
CPC ........ *G06F 16/90335* (2019.01); *G06F 16/23* (2019.01); *H04L 9/0637* (2013.01); *H04L 2209/38* (2013.01)

(58) Field of Classification Search
CPC . G06F 16/90335; G06F 16/23; H04L 9/0637; H04L 2209/38
See application file for complete search history.

(56) References Cited

U.S. PATENT DOCUMENTS

| 2017/0132257 | A1* | 5/2017 | Baird, III | G06F 16/27 |
| 2020/0057760 | A1* | 2/2020 | Zhao | G06F 16/2379 |
| 2020/0136804 | A1* | 4/2020 | Zhuo | H04L 9/0643 |
| 2020/0267187 | A1* | 8/2020 | Singh | G06F 21/64 |
| 2020/0364205 | A1* | 11/2020 | Novotny | G06F 16/217 |

FOREIGN PATENT DOCUMENTS

KR   10-2018-0130623 A    12/2018

* cited by examiner

*Primary Examiner* — Hares Jami
(74) *Attorney, Agent, or Firm* — The PL Law Group, PLLC

(57) ABSTRACT

An apparatus for guaranteeing the integrity of a state database includes a memory for storing one or more instructions, a communication interface for communicating with one or more blockchain nodes and a processor. The processor is configured, by executing the stored one or more instructions, to receive a request to query for a state value, obtain a first state value by querying a state database in response to the request, forward the request to the one or more blockchain nodes to receive a second state value from the one or more blockchain nodes and compare the first state value with the second state value to determine integrity of a state value.

14 Claims, 12 Drawing Sheets

APPARATUS FOR GUARANTEEING INTEGRITY OF STATE DATABASE IN BLOCKCHAIN-BASED ENVIRONMENT AND METHOD THEREOF

CROSS-REFERENCE TO RELATED APPLICATION

This application claims the benefit of Korean Patent Application No. 10-2019-0058190, filed on May 17, 2019, in the Korean Intellectual Property Office, the disclosure of which is incorporated herein by reference in its entirety.

BACKGROUND

1. Technical Field

The present disclosure relates to an apparatus and a method for guaranteeing the integrity of a state database (DB) in a blockchain-based system. More specifically, the present disclosure relates to an apparatus for guaranteeing the integrity of a state DB when processing a request to query for a state value in a blockchain-based system by performing integrity verification of a state value stored in the state DB to guarantee the integrity of a query result and restoring the integrity of a manipulated state value and an operating method of the apparatus.

2. Description of the Related Art

A blockchain refers to a data management technique, in which persistently increasing data are recorded in blocks of a specific unit, and each blockchain node constituting a peer-to-peer (P2P) network manages the blocks in a data structure of a chain form. A blockchain can guarantee the integrity and security of transactions through a consensus process, in which all blockchain nodes belong to a network verify and record all transactions.

Most existing blockchain-based systems (e.g., a hyperledger) operate a state DB storing the latest state data (i.e., data consisting of values corresponding to state keys) separate from a blockchain. For example, each blockchain node manages a state DB, and uses the state DB to process a query request for a state value (that is, a query transaction).

However, most blockchain-based systems do not perform integrity verification for a state value when processing a query request. Therefore, a malicious blockchain node can easily manipulate its state DB and provide the manipulated state value as a query result. As a result, the reliability of a query result cannot be guaranteed in a blockchain-based system, and the integrity of a state DB cannot be guaranteed as well.

SUMMARY

Aspects of the present disclosure provide an apparatus and a method of operating the apparatus which can guarantee the integrity of a state database (DB) in a blockchain-based system.

Other aspects of the present disclosure provide an apparatus and a method of operating the apparatus which can guarantee the reliability of a query result in a blockchain-based system.

Other aspects of the present disclosure provide an apparatus and a method of operating the apparatus which can guarantee a predetermined level of query transaction processing performance while guaranteeing the integrity of a state DB in a blockchain-based system.

Aspects of the present disclosure are not limited to the above-mentioned aspects, and other aspects that are not mentioned will be clearly understood by those skilled in the art from the following description.

According to an exemplary embodiment of the present disclosure, an apparatus for guaranteeing integrity of a state database is provided. The apparatus may include a memory for storing one or more instructions, a communication interface for communicating with one or more blockchain nodes, and a processor, wherein the processor is configured, by executing the stored one or more instructions, to perform operations including, receiving a request to query for a state value, obtaining a first state value by querying a state database in response to the request, forwarding the request to the one or more blockchain nodes to receive a second state value from the one or more blockchain nodes, and comparing the first state value with the second state value to determine integrity of a state value.

According to an exemplary embodiment of the present disclosure, an apparatus for guaranteeing integrity of a state database is provided. The apparatus includes a memory for storing one or more instructions, a communication interface for communicating with a plurality of blockchain nodes, and a processor, wherein the processor is configured, by executing the stored one or more instructions, to perform operations including, receiving a request to query for a state value, forwarding the request to the plurality of blockchain nodes in response to the request, receiving a plurality of state values from the plurality of blockchain nodes, and comparing the plurality of received state values to determine integrity of a state value.

According to an exemplary embodiment of the present disclosure, a method for guaranteeing integrity of a state database in a computing device comprising, receiving a request to query for a state value, obtaining a first state value by querying a state database of the computing device in response to the request, forwarding the request to one or more blockchain nodes to receive a second state value from the one or more blockchain nodes, and comparing the first state value with the second state value to determine integrity of the requested state value.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, exemplary embodiments of the present disclosure will be described with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be consulted as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular firms are intended to include the plural forms as well, unless the context clearly indicates otherwise.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

One or more embodiments of the present disclosure, which will be described below, are directed to an apparatus or an operating method of the apparatus, which can guarantee the integrity of a state DB and guarantee a predetermined level of query performance (that is, processing performance of a query transaction) in a blockchain-based system. Before describing exemplary embodiments of the present disclosure, an integrity problem of a state DB will be briefly described in order to provide more understanding.

Figure 1:
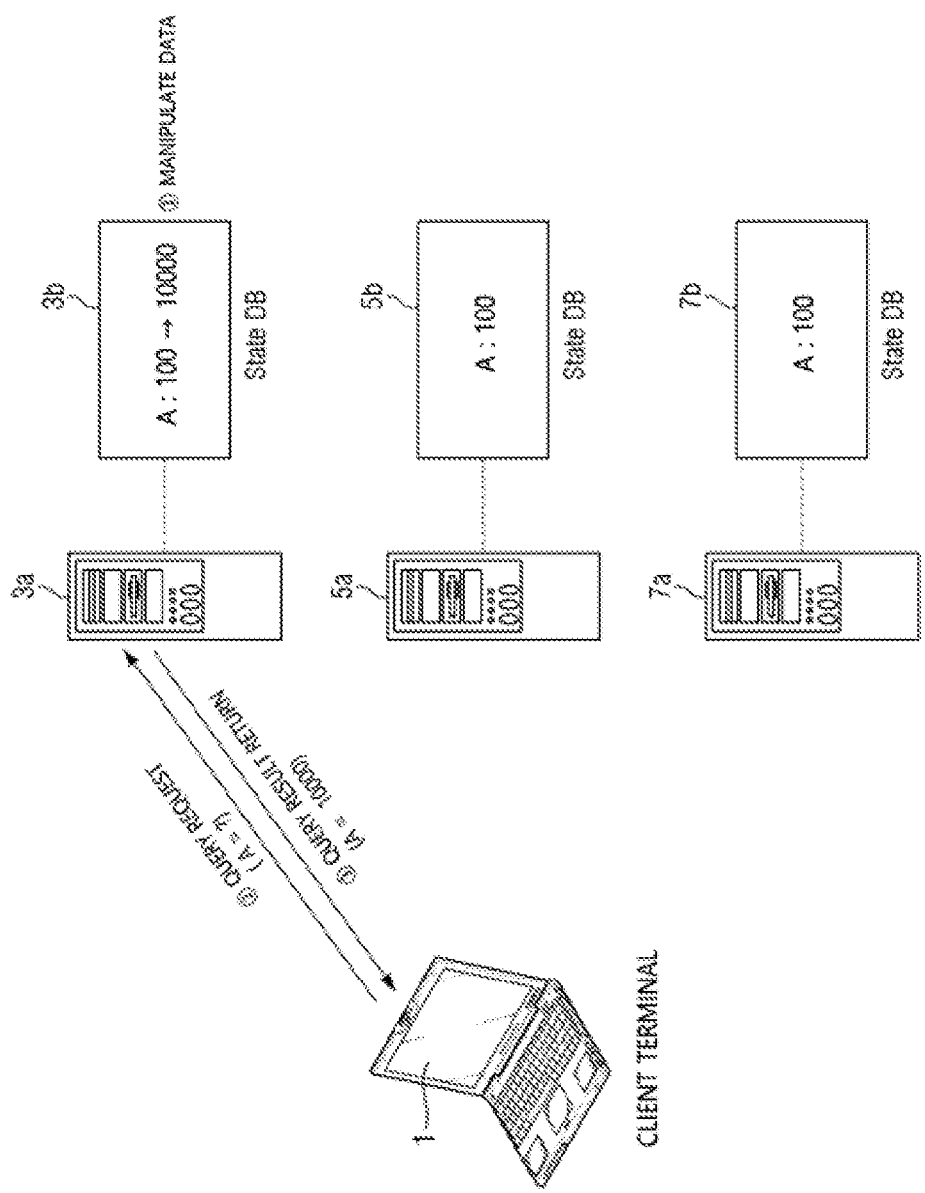
FIG. 1 is an exemplary diagram for describing an integrity problem of a state DB that may occur in a blockchain environment.

FIG. 1 is an exemplary diagram illustrating an integrity problem of a state DB that may occur in a blockchain-based system. More specifically, FIG. 1 illustrates a process, in which a first blockchain node 3*a* among three blockchain nodes 3*a*, 5*a* and 7*a* processes a query request of a client terminal 1. Further, FIG. 1 shows an example, in which a first blockchain node 3*a* has manipulated its own state DB 3*b*.

As shown in FIG. 1, a case, in which the first blockchain node 3*a* having malicious intention manipulates (e.g., forges, modulates) a specific state value (e.g., a value corresponding to state key A) of the state DB 3*b*, may occur (①). This is because data recorded in a blockchain cannot be easily manipulated due to its characteristics, but a state data stored in a state DB can be easily manipulated by the corresponding blockchain node 3*a*.

After the state value has been manipulated, when a client terminal 1 requests a query for a specific state value (e.g., requests a query with a state key A) to the first blockchain node 3*a*, the client terminal 1 receives the manipulated state value (e.g., 10,000) from the blockchain node 3*a* (②, ③). This is because none of the blockchain nodes 3*a*, 5*a*, and 7*a* perform integrity verification for a query transaction.

The reason for not performing an integrity verification operation is closely related to the processing performance of a query transaction. In order to verify the integrity of a state value, processing operations, such as accessing a blockchain to obtain transaction data associated with the corresponding state value and comparing transaction data with the state value, should be performed. Since these operations cause accessing and processing delay, the processing performance of a query transaction is inevitably degraded when integrity verification is performed. In particular, since a blockchain is generally implemented in the form of a file system, frequent access to a blockchain will cause significant delay, which can greatly degrade the query transaction processing performance of the entire system.

For the above performance reasons, various blockchain-based systems process a query transaction using only state DBs (e.g. 3*b*, 5*b* and 7*b*) without performing an integrity verification operation. However, if the state DBs (e.g., 3*b*, 5*b* and 7*b*) are used as shown in FIG. 1, the reliability of a query result and the integrity of a state DB cannot be guaranteed, which inevitably causes a security problem of a blockchain-based system.

Hereinafter, exemplary embodiments of the present disclosure for solving one or more of the above-mentioned problems will be described.

Figure 2:
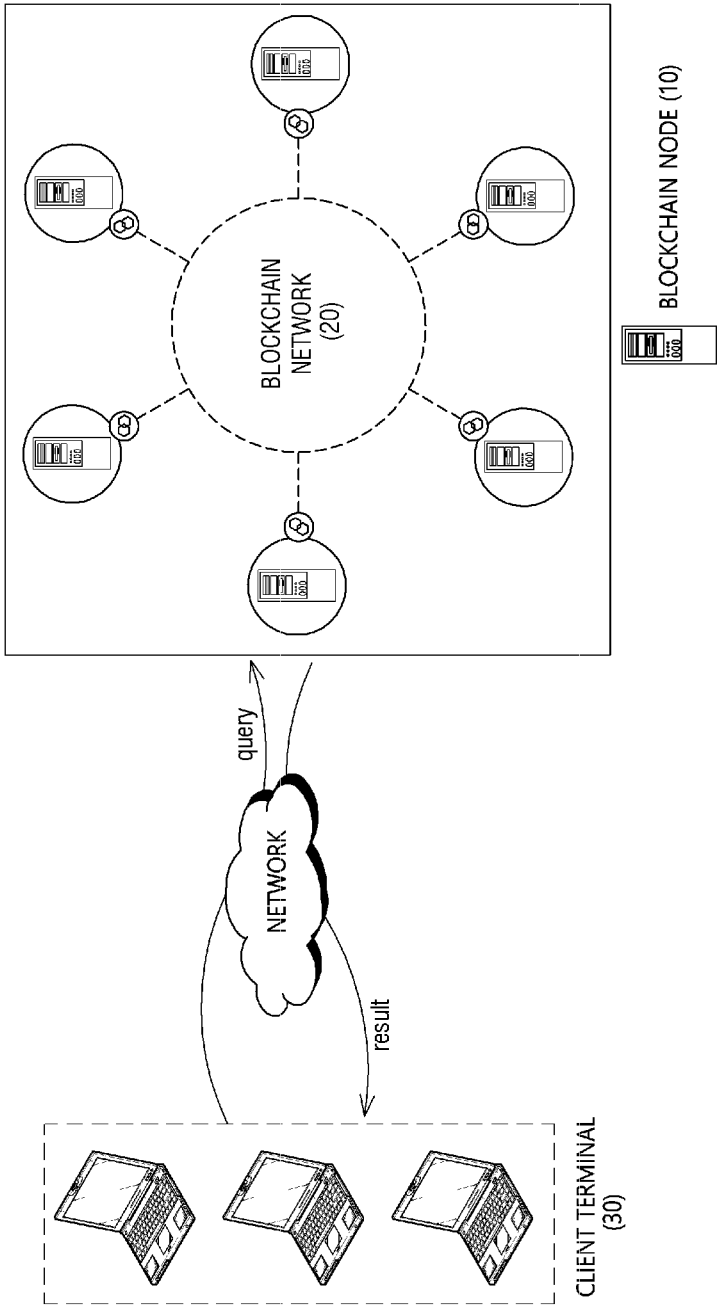
FIG. 2 is an exemplary configuration diagram for describing a blockchain-based system according to an embodiment of the present disclosure.

FIG. 2 is an exemplary configuration diagram illustrating a blockchain-based system according to an embodiment of the present disclosure.

As shown in FIG. 2, a blockchain-based system may include a plurality of blockchain nodes 10 forming a blockchain network 20. However, this is a mere exemplary embodiment for achieving the purpose of the present disclosure, and some components may be added or deleted as necessary. Further, each component of a blockchain-based system illustrated in FIG. 2 represents functionally divided functional elements, and it is noted that a plurality of components may be implemented in an integrated form in an actual physical environment. For example, a client terminal 30 and one or more blockchain nodes 10 may be implemented in the form of different logics within the same physical computing device.

The blockchain-based system may provide a transaction processing service to one or more client terminals 30. For example, the blockchain-based system may process a query transaction received from the client terminal 30. That is, the client terminal 30 may request a query by transmitting a query transaction including a state key, and the blockchain-based system may provide a state value corresponding to the state key.

A blockchain node 10 forms a blockchain network of a P2P structure, and is a node operating according to a blockchain protocol/algorithm. In order not to obscure the subject matter of the present disclosure, descriptions of general features of a blockchain technology will not be described. Hereinafter, reference numeral "10" is used to refer to any blockchain node, and an alphabet (e.g., a, b, c) is written together in reference numeral "10" when distinguishingly referring to a plurality of blockchain nodes. Further, reference numerals of the tenth number (e.g., 11, 12, 13, etc.) are to be used for the purpose of distinguishing each blockchain node 10 according to an embodiment.

The blockchain node 10 may be implemented as a physical computing device, or may be implemented as a logical computing device such as a virtual machine. When the blockchain node 10 is implemented as a logical computing device, a plurality of blockchain nodes 10 may be included in the same physical computing device. The physical computing device may be a laptop computer, a desktop computer, or the like, but is not limited thereto and may include any type of device having a computing function and a communicating function. An example of the physical computing device will be described in FIG. 12.

Figure 3:
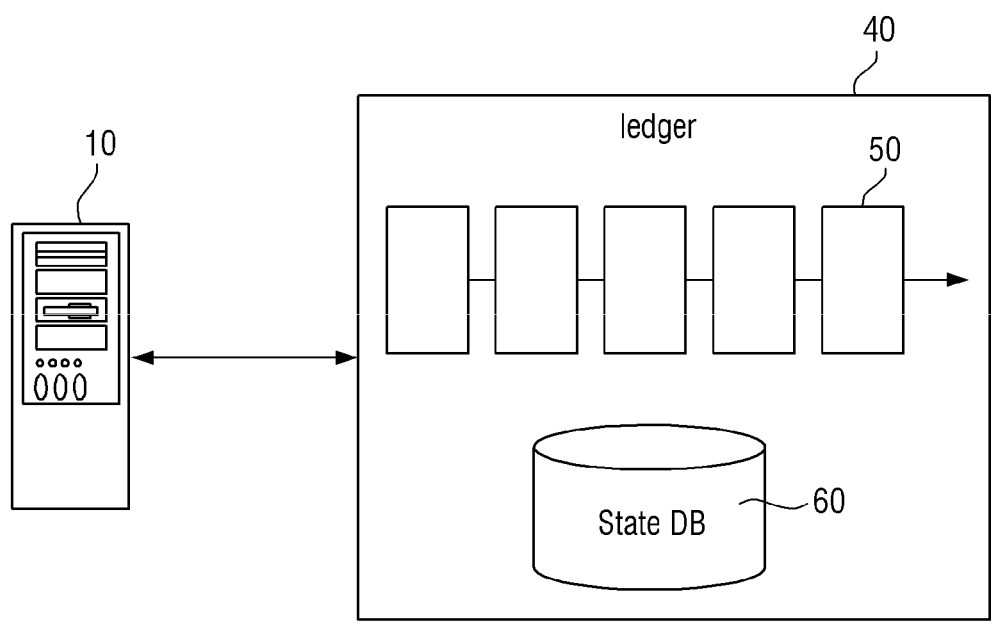
FIG. 3 is an exemplary diagram for describing a configuration of a ledger that may be referred to in one or more embodiments of the present disclosure.

In one or more embodiments of the present disclosure, each blockchain node 10 may manage a ledger 40, as shown in FIG. 3. The ledger 40 may include a blockchain 50, in which transaction data is recorded, and a state DB 60, in which state data is stored. The state DB 60 may store the latest state data. However, the technical scope of the present disclosure is not limited thereto, and the state DB 60 may further store past state data. As described above, the state DB 60 may be used for the purpose of improving the processing performance of a query transaction by minimizing access to the blockchain 50.

Further, according to one or more embodiments of the present disclosure, the blockchain node 10 may guarantee the reliability of a query result by verifying the integrity of a query-requested state value using a state DB of another blockchain node. In addition, the blockchain node 10 may restore the integrity of a state value by using the state DB of another blockchain node or its own blockchain (e.g. 50). Through this, the integrity of a state DB (e.g. 60) can also be guaranteed. In such an embodiment, the blockchain node 10 may also be referred to as a state DB integrity verification device or a state DB integrity guarantee device. A more detailed description of this embodiment will be described later with reference to the drawings following FIG. 4.

A client terminal 30 is a device that receives a transaction processing service from a blockchain-based system. The client terminal 30 may be implemented in any device.

The client terminal 30 and the blockchain-based system can communicate via a network. The network may be any type of wired/wireless network such as a local area network (LAN), a wide area network (WAN), a mobile radio communication network, a wireless broadband Internet (Wibro), or the like.

So far, the blockchain-based system according to one or more embodiments of the present disclosure has been described with reference to FIGS. 2 and 3. Hereinafter, a method of guaranteeing the integrity of a state DB according to one or more embodiments of the present disclosure will be described with reference to FIGS. 4 to 8.

For convenience of understanding, it is assumed that the integrity guaranteeing method is performed in a blockchain environment shown in FIG. 2. For example, the integrity guaranteeing method may be performed by the blockchain node 10 shown in FIG. 2, and the blockchain node 10 may execute one or more instructions that implement the integrity guaranteeing method to perform the integrity guaranteeing method. Hereinafter, it may be understood that when the subject of each operation is omitted in the description of the present embodiment, it may be performed by the apparatus 10 illustrated above. Further, in the integrity guaranteeing method according to the present embodiment, the execution order of each operation may be changed within a range, in which the execution order may be logically changed as necessary.

Figure 4:
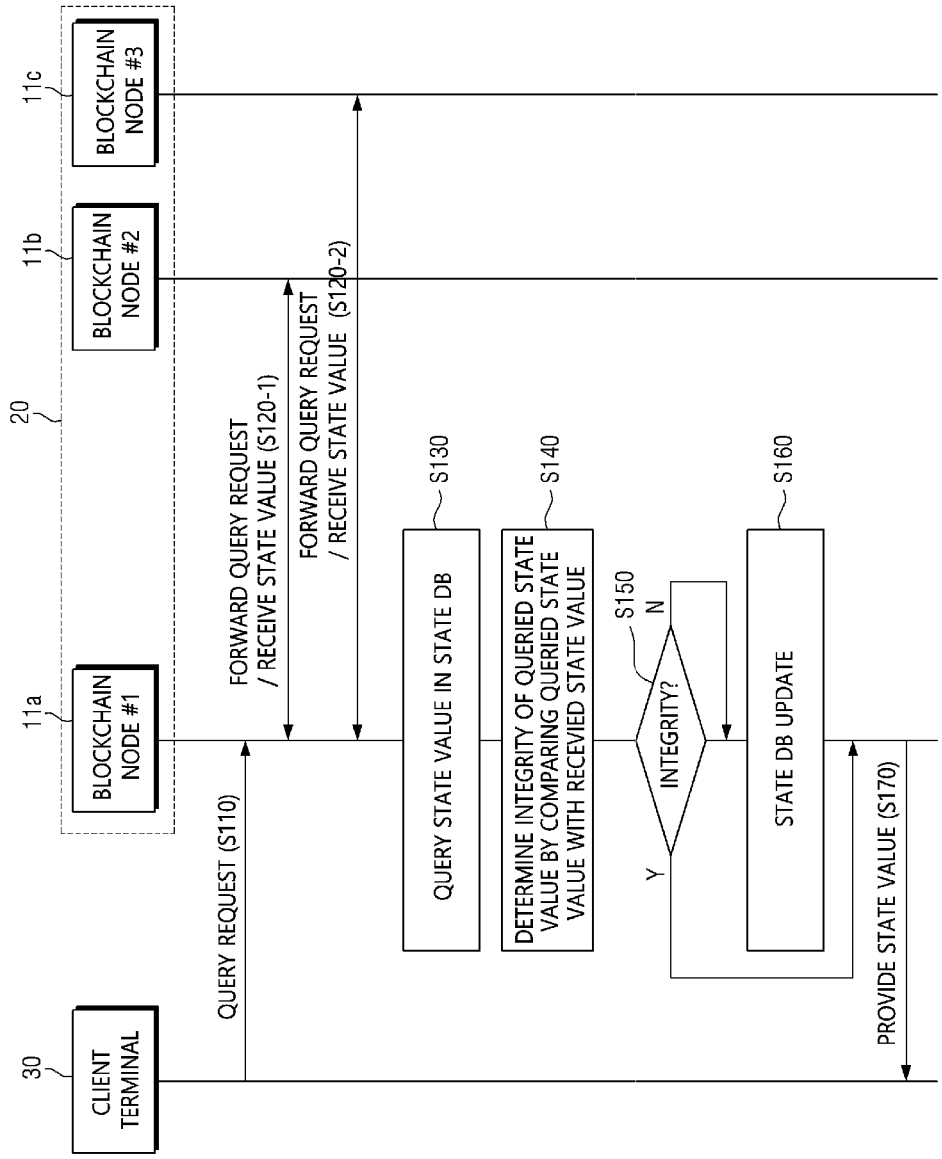
FIG. 4 is an exemplary flowchart for describing a method of guaranteeing the integrity of a state DB according to a first embodiment of the present disclosure.

FIG. 4 is an exemplary flowchart illustrating a method of guaranteeing the integrity of a state DB according to a first embodiment of the present disclosure. Although FIG. 4 illustrates three blockchain nodes 11a, to 11c, this is only for convenience of understanding and the number of blockchain nodes may vary. Further, the flow shown in FIG. 4 is merely an exemplary embodiment for achieving the purpose of the present disclosure, and some steps may be added or deleted as necessary.

In the following description, for convenience of explanation, a blockchain node 11a that has received a query request from a client terminal 30 is referred to as a "processing node" 11a, and other blockchain nodes 11b and 11c are referred to as "peripheral nodes" 11b and 11c. However, the peripheral nodes 11b and 11c do not include only nodes, whose physical or logical distances are close to the processing node 11a, and may include any blockchain node, which is included in a blockchain network 20 and capable of communicating with the processing node 11a.

As shown in FIG. 4, the integrity guaranteeing method may be started at step S110 where a query for a state value is requested. Receiving a query request can be understood as receiving a query transaction that includes a state key.

At step S120-1 and step S120-2, the query request is forwarded to the peripheral nodes 11b and 11c, and a state value is received from the peripheral nodes 11b and 11c. More specifically, when the processing node 11a forwards the query request to the peripheral nodes 11b and 11c, each peripheral node 11b and 11c queries its own state DB with the requested state key and transmits the queried state value to the processing node 11a.

In one or more embodiments, peripheral nodes 11b and 11c may also perform operations of the processing node 11a shown in FIG. 4. For example, the peripheral node 11b also may receive a state value from other peripheral nodes by forwarding a query request to other peripheral nodes and compare its state value with the received state value to perform integrity determination on the state value. Further, when it is determined that integrity is broken, the peripheral node 11b may restore its state value and transmit the restored state value to the processing node 11. A method of restoring a state value will be described later.

At step S130, the state value requested from a state DB of the processing node 11a is queried. That is, the state DB is queried with a requested state key and a state value corresponding to the state key can be obtained. In some embodiments, step S130 may be performed simultaneously with forwarding steps S120-1 and S120-2, and step S130 may be performed before forwarding steps S120-1 and S120-2.

At steps S140 and S150, the queried state value is compared with the state value received from the peripheral node. Further, integrity of the state value is determined based on the comparison result. For example, when the queried state value is consistent with the received state value, the queried state value may be determined to have integrity. If it is determined that the queried state value does not have integrity, step S160 may be further performed.

At step S160, the state DB is updated to restore the integrity of the state value. At this step, a specific method and update range for updating the state DB may vary according to embodiments.

In some embodiments, a particular state value (i.e., a state value, of which integrity is broken) of the state DB may be updated using the state value received at previous steps S120-1 and/or S120-2. For example, by setting the received state value to a value corresponding to the state key requested to be queried, the integrity of the state value can be restored. According to this embodiment, an update to a state DB can be performed at high speed without accessing a blockchain.

In some embodiments, a particular state value (i.e., a state value, of which integrity is broken) of a state DB may be updated using transaction data recorded in a blockchain. For example, among transaction data recorded in a blockchain of the processing node 11a, a state value corresponding to a state key requested to be queried from transaction data associated with the particular state value (i.e., the latest state value) may be obtained. Then, by setting the obtained state value to the particular state value, the integrity of the state value can be restored. Due to the characteristic of a blockchain, it is almost impossible to manipulate transaction data recorded in the blockchain. Therefore, according to the present embodiment, the integrity of a state DB can be better guaranteed.

In some embodiments, a state DB may be updated overall using transaction data recorded in a blockchain. For example, by executing transactions sequentially based on transaction data recorded in a blockchain, a state DB can be rebuilt (i.e., overall state values are updated). The reason for rebuilding a state DB is that if a particular state value has been manipulated, it is likely that other state values have also been manipulated. According to the present embodiment, since all state values are updated to values having integrity, the integrity of a state DB can be better guaranteed. However, in the present embodiment, a response delay to a query request (e.g., access to a blockchain and processing delay) may be occurred due to rebuild of a state DB. In order to reduce the response delay, in some embodiments, a query result may be first provided to the client terminal 30 using transaction data or a state value received from peripheral nodes, and then rebuild of a state DB may be performed.

In some embodiments, a state DB may be updated based on various combinations of the above-described embodiments. For example, the above-described embodiments may be combined based on load of the processing node 11a and/or load of the blockchain network 20. More specifically, when the load is less than a threshold, a state DB is rebuilt, and when the load is greater than or equal to the threshold, only a particular state value may be updated using a state value received from a blockchain or the peripheral nodes 11b and 11c. As another example, when the number of manipulations of a state DB is greater than or equal to a threshold, the state DB may be rebuilt, and when less than the threshold, only a particular state value may be updated. As such, the above-described embodiments may be combined in various ways based on various conditions.

At step S170, the requested state value is provided to the client terminal 30.

In some embodiments, the order of performing the above-described step S160 and step S170 may be changed or may be performed simultaneously with each other. For example, a state value received from the peripheral nodes 11b and 11c may be directly provided to the client terminal 30, and a state DB may be updated using the received state value simultaneously or afterwards. In such a case, a response time to a query request may be minimized.

Further, in some embodiments, each blockchain node 11a to 11c may autonomously perform an integrity verification operation (e.g., operations of steps S120-1 to S160) according to a predetermined condition irrespective of a query request of the client terminal 30. The condition may include at least one of a timer condition based on a predetermined period, a condition in which the number of manipulations of a state DB is greater than or equal to a reference value, and a condition in which load of the blockchain nodes 11a to 11c and/or the blockchain network 20 is less than a reference value. In addition, a condition can be specified in various ways, so that the technical scope of the present disclosure is not limited to the conditions listed above. According to the present embodiment, even if there is no query request, an integrity verification of a state DB can be performed autonomously, and thus the integrity guarantee level of a state DB can be improved throughout the blockchain network 20.

In the following descriptions, for convenience of understanding, the integrity guaranteeing method according to the first embodiment described above will be further described with reference to the examples illustrated in FIGS. 5 and 6.

Figure 5:
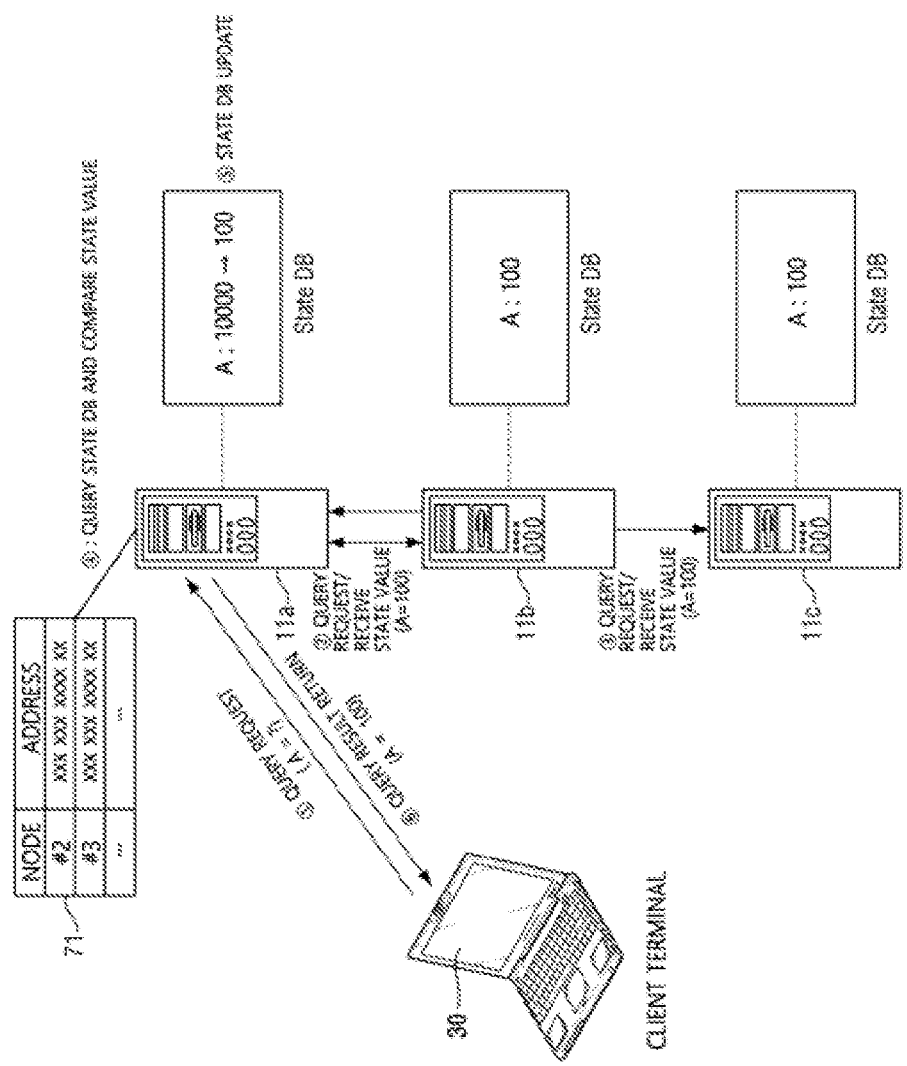
FIGS. 5 and 6 are exemplary diagrams for further describing a method of guaranteeing the integrity of a state DB according to a first embodiment of the present disclosure.

FIG. 5 illustrates a case where a state DB of a processing node 11a has been manipulated.

As shown in FIG. 5, the processing node 11a receiving a query request may forward the query request to peripheral nodes 11b and 11c using a node table 71 and receive a state value (①②③). The node table 71 may include address information of the peripheral nodes 11b and 11c.

In some embodiments, the node table 71 may further include state information of the peripheral nodes 11b and 11c. Further, the processing node 11a may determine peripheral nodes 11b and 11c to receive the query request in consideration of the state information. In this case, the state information may include communication delay information such as round trip time (RTT), health check information of the peripheral nodes 11b and 11c (e.g., failure, disconnection of communication), load information of the peripheral nodes 11b and 11c, and the like, but is not limited thereto. In the present embodiment, in consideration of the above-listed state information, the processing node 11a may select a peripheral node capable of communication and having low communication delay or low load, and forward the query request to the selected peripheral node. According to the present embodiment, since a response to the state value request is quickly received from the peripheral nodes 11b and 11c, the processing speed for a query request may be improved.

In some other embodiments, the processing node 11a may flood or broadcast a query request to a number of peripheral nodes regardless of the state information. Further, the processing node 11a may perform integrity verification operations (e.g., ④ and ⑤) using state values received within a reference time or state values more than a reference number. Even according to the present embodiment, since a response to a state value request is quickly received from the peripheral nodes 11b and 11c, the processing speed for a query request can be improved.

Next, the processing node 11a may determine that the queried state value (e.g., 10,000) does not have integrity by comparing the result of querying its state DB (e.g., 10,000) with the received state value (e.g., 100) (④). In response to the determination, the processing node 11a may update the state DB, thereby restoring the integrity of the state DB (⑤).

Further, by providing an original state value (e.g., 100) as a query result instead of the manipulated state value (e.g., 10,000), the reliability of the query result can be guaranteed (⑥).

Hereinafter, descriptions will be given with reference to an example shown in FIG. 6. FIG. 6 illustrates a case where a state DB of a particular peripheral node 11b has been manipulated.

Figure 6:
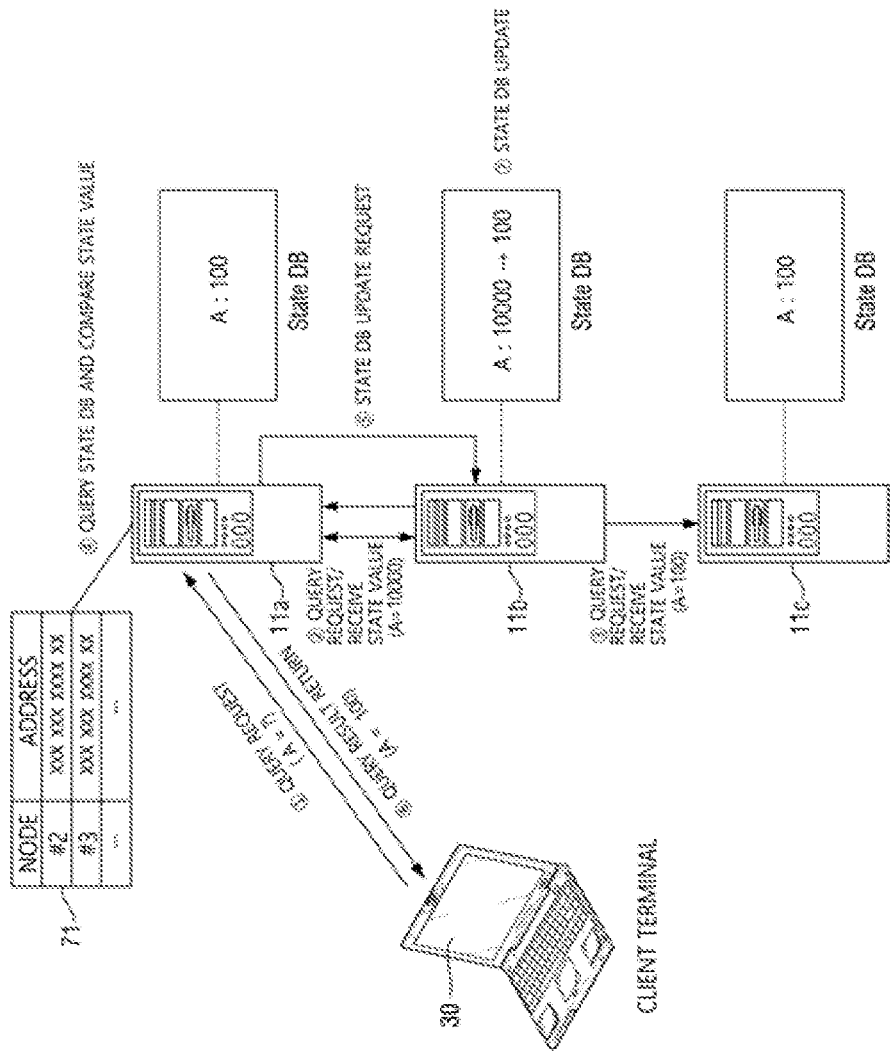

As shown in FIG. 6, a processing node 11a compares a state value queried in a state DB with a state value received from peripheral nodes 11b and 11c, thereby determining that the state DB of the particular peripheral node 11b has been manipulated (4). For example, when a state value received from the particular peripheral node 11b is not consistent with another state value, the processing node 11a may determine that the received state value has been manipulated. In some embodiments, to more accurately determine whether it has been manipulated, the processing node 11a may further determine whether it has been manipulated by using transaction data recorded in a blockchain.

In this case, the processing node 11a may request the particular peripheral node 11b to update the state DB. For example, the processing node 11a may send a state DB update request message to the particular peripheral node 11b. The state DB update request message may also include state values of other blockchain nodes (e.g., 11a and 11c).

The particular peripheral node 11b receiving the request may update its state DB (⑦). The update of the state DB can be performed by using various ways, such as using state values of other blockchain nodes (e.g., 11a and 11c) and using transaction data recorded in a blockchain. In this regard, the above-described embodiments can be referred to.

So far, the method of guaranteeing the integrity of a state DB according to the first embodiment of the present disclosure has been described with reference to FIGS. 4 to 6. According to the above-described method, when processing a query request, the integrity of a state DB managed by a particular blockchain node may be verified using state data managed by another blockchain node. Further, the integrity of a state DB can be restored in various ways. Accordingly, the integrity of a state DB in a blockchain-based system can be guaranteed, and the reliability of a query result also can be guaranteed.

Hereinafter, a method of guaranteeing the integrity of a state DB according to a second embodiment of the present disclosure will be described with reference to FIG. 7. For the sake of clarity, descriptions of overlapping contents with the foregoing embodiments will be omitted.

Figure 7:
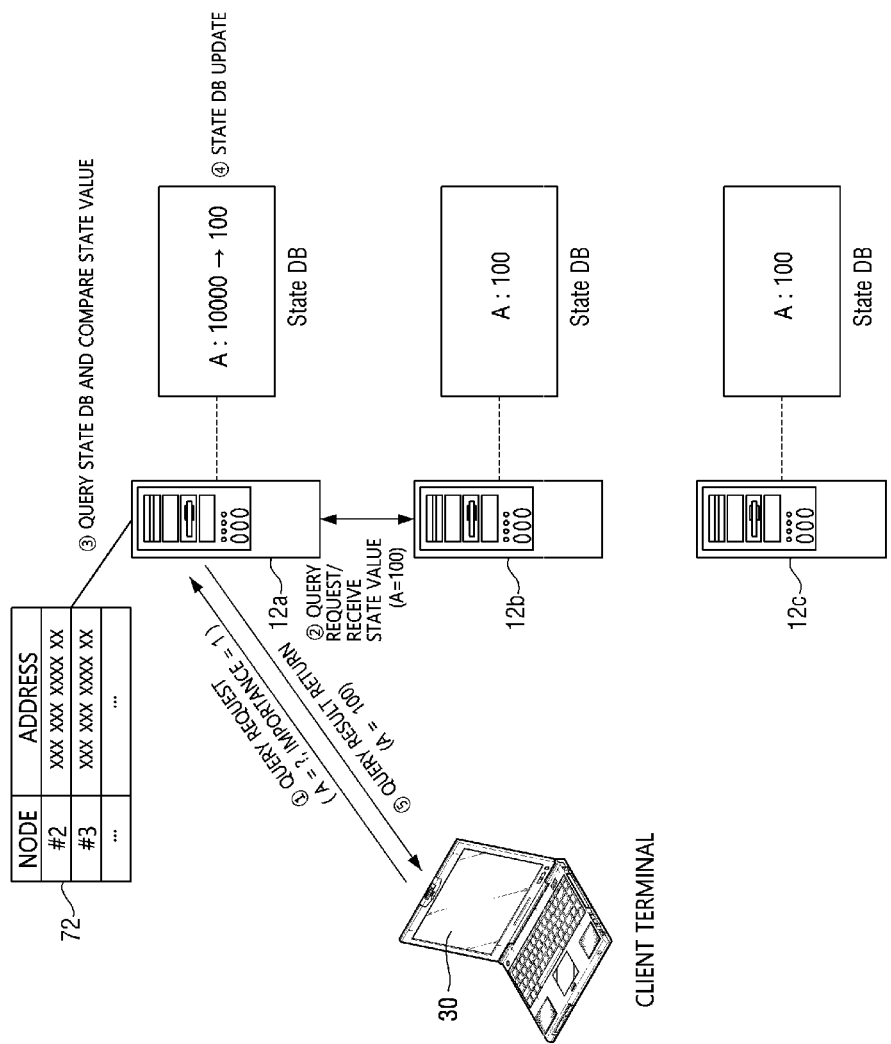
FIG. 7 is an exemplary diagram for describing a method of guaranteeing the integrity of a state DB according to a second embodiment of the present disclosure.

As shown in FIG. 7, in the second embodiment, the importance of a query request (that is, the importance of a query transaction) is considered, and an integrity verification operation may be mitigated or enhanced based on the importance. The importance may be a value received from a client terminal 30, but the technical scope of the present disclosure is not limited thereto. In some other embodiments, the importance may be set for each type of transaction in advance. In this case, even if an importance value is not received from the client terminal 30, a processing node 12a may properly perform integrity verification by reflecting the importance according to a transaction type. Hereinafter, for convenience of understanding, it is assumed that the importance is received from the client terminal 30.

In some embodiments, the processing node 12a may determine the number of peripheral nodes to receive a query request based on importance received with the query request. For example, the higher the importance, the more the number of peripheral nodes, to which the query request can be forwarded. This is because the more the number of state values being compared, the stronger the integrity verification. FIG. 7 illustrates that the processing node 12a forwards a query request to one peripheral node 12b because the importance of the query request is "1" (②).

In some other embodiments, the processing node 12a may forward (e.g., flood) a query request to a plurality of peripheral nodes 12b and 12c first and perform an integrity verification operation by receiving only state values equal to or greater than a reference number. In this case, the reference number may be determined based on the importance of the query request. For example, the higher the importance, the greater the reference number to be determined. This is because the more the number of state values being compared, the stronger the integrity verification. In an effective aspect, this embodiment is similar to the embodiment described above. However, in the present embodiment, since an integrity verification operation can be quickly performed using a state value received first, processing time for a query request can be shortened.

So far, the method of guaranteeing the integrity of a state DB according to the second embodiment of the present disclosure has been described with reference to FIG. 7. According to the above-described method, integrity verification may be performed differentially according to the importance of a query request. For example, when processing a high priority query request, the reliability of a query result can be greatly improved by enhancing integrity verification. On the contrary, when processing a low priority query request, the integrity verification can be mitigated, so that the inquiry request can be processed quickly even if the reliability of a query result is somewhat lower.

Figure 8:
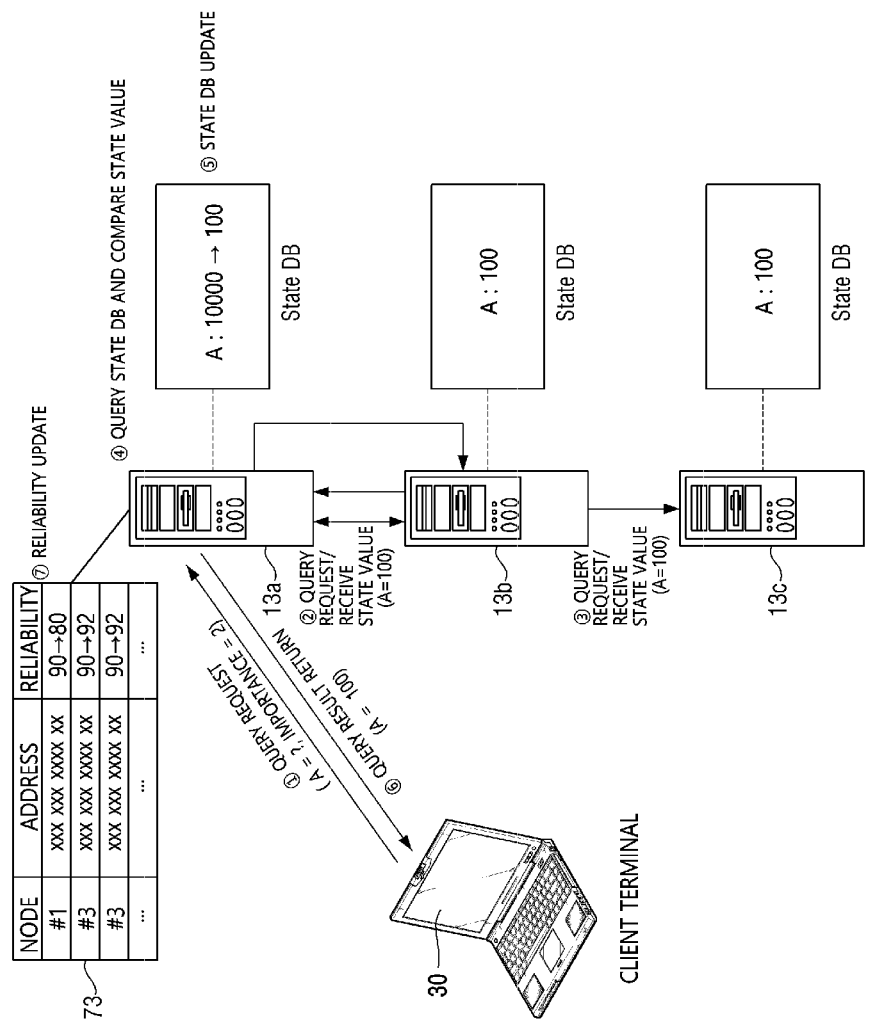
FIG. 8 is an exemplary diagram for further describing a method of guaranteeing the integrity of a state DB according to a third embodiment of the present disclosure.

Hereinafter, a method of guaranteeing the integrity of a state DB according to a third embodiment of the present disclosure will be described with reference to FIG. 8. For the sake of clarity, descriptions of overlapping contents with the foregoing embodiments will be omitted.

In the third embodiment, an integrity verification operation may be performed in consideration of a reliability score of blockchain nodes 13a to 13c. As illustrated in FIG. 8, a node table 73 may further include reliability score information, and the reliability score information may be adjusted based on whether a state DB is manipulated, the number of manipulations, and the like (⑦). For example, the reliability score of a blockchain node (e.g., 13a), in which the state DB is manipulated, may be decreased (e.g., 90→80). Further, the reliability score of blockchain nodes (e.g., 13b and 13c), in which the state DB is not manipulated, may be increased (e.g., 90→92).

In addition, the reliability score may reflect the security level of the blockchain nodes 13a to 13c. For example, a higher reliability score may be given to a blockchain node located in an intranet, a blockchain node equipped with a security-related software, and the like.

The reliability score may be utilized in various ways, and the specific utilization method may vary according to embodiments.

In some embodiments, a query request may be forwarded to only a peripheral node whose reliability score is above a reference value. Further, an integrity verification operation may be performed using a state value received from a peripheral node whose reliability score is equal to or greater than a reference value. In some embodiments, the reference value may be dynamically determined based on the importance of a query request. That is, when processing a query request of high importance, an integrity verification operation may be performed using a state value of a peripheral node having high reliability.

In some embodiments, in response to determining that the reliability score is less than a reference value, the corresponding blockchain node may autonomously perform an integrity verification operation. When the integrity verification operation is completed, the reliability score of the corresponding blockchain node may be increased. According to the present embodiment, the reliability of a blockchain network can be efficiently guaranteed by autonomously performing an integrity verification operation at a blockchain node having low reliability.

In some embodiments, in response to determining that the reliability score is less than a reference value, a corresponding blockchain node may be excluded from a blockchain network. According to the present embodiment, since a malicious blockchain node is excluded from a blockchain network, the security and reliability of a blockchain network can be efficiently guaranteed.

In some embodiments, an integrity restoring operation may be mitigated or enhanced based on the reliability score. For example, if the reliability score is less than a reference value, a state DB may be rebuilt. In the opposite case, an integrity restoring operation can be terminated by updating a specific state value having no integrity. According to this embodiment, by differently performing an integrity restoring operation based on the reliability score, resources of a blockchain node can be effectively utilized.

So far, the method of guaranteeing the integrity of a state DB according to the third embodiment of the present disclosure has been described with reference to FIG. 8. Hereinafter, a method of guaranteeing the integrity of a state DB according to a fourth embodiment of the present disclosure will be described with reference to FIGS. 9 to 11.

First, an exemplary blockchain-based system, on which an integrity guaranteeing method according to the fourth embodiment may be performed, will be briefly described with reference to FIG. 9, For the sake of clarity, descriptions of overlapping contents with the system illustrated in FIG. 2 will be omitted.

Figure 9:
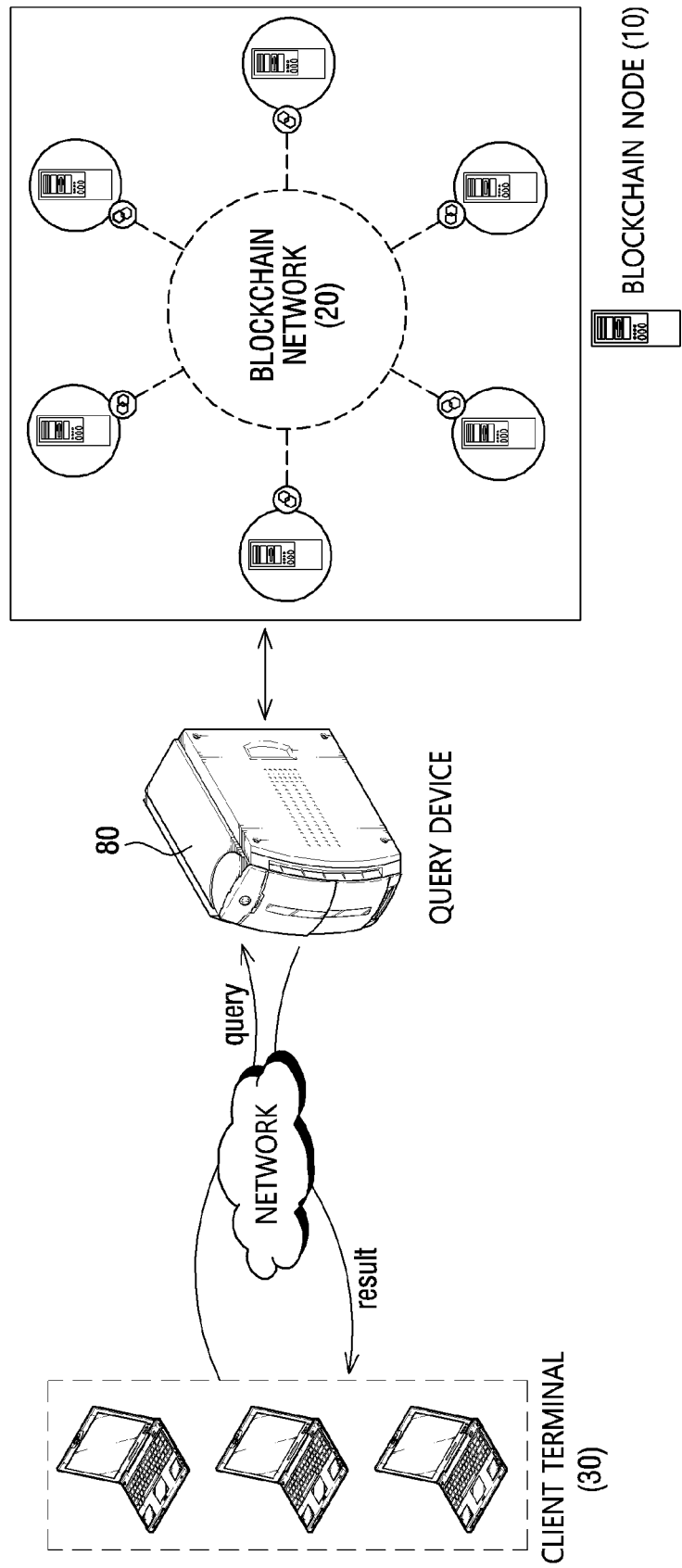
FIG. 9 is an exemplary configuration diagram for describing a blockchain-based system according to another embodiment of the present disclosure.

As shown in FIG. 9, the exemplary blockchain-based system may further include a query device 80. The query device 80 may be implemented as a computing device, and an example of the computing device may refer to FIG. 12.

The query device 80 may process a query request of a client terminal 30 interworking with a blockchain network 20 in the form of a proxy. FIG. 9 illustrates that one query device 80 is disposed as an example, but in some exemplary embodiments, a plurality of query devices 80 may be arranged. In this case, each query device 80 may interwork with the entire blockchain network 20, a specific channel or a blockchain node 10 belonging to a specific group, and a specific interworking form may be variously designed and selected according to an embodiment.

In the exemplary blockchain-based system, the query device 80 may manage node tables (e.g., 71, 72, and 73) and perform the integrity verification operation described above. Therefore, the query device 80 may be referred to as a state DB integrity verifying device or a state DB integrity guaranteeing apparatus. A detailed operation method will be described with reference to the drawings following FIG. 10.

Figure 10:
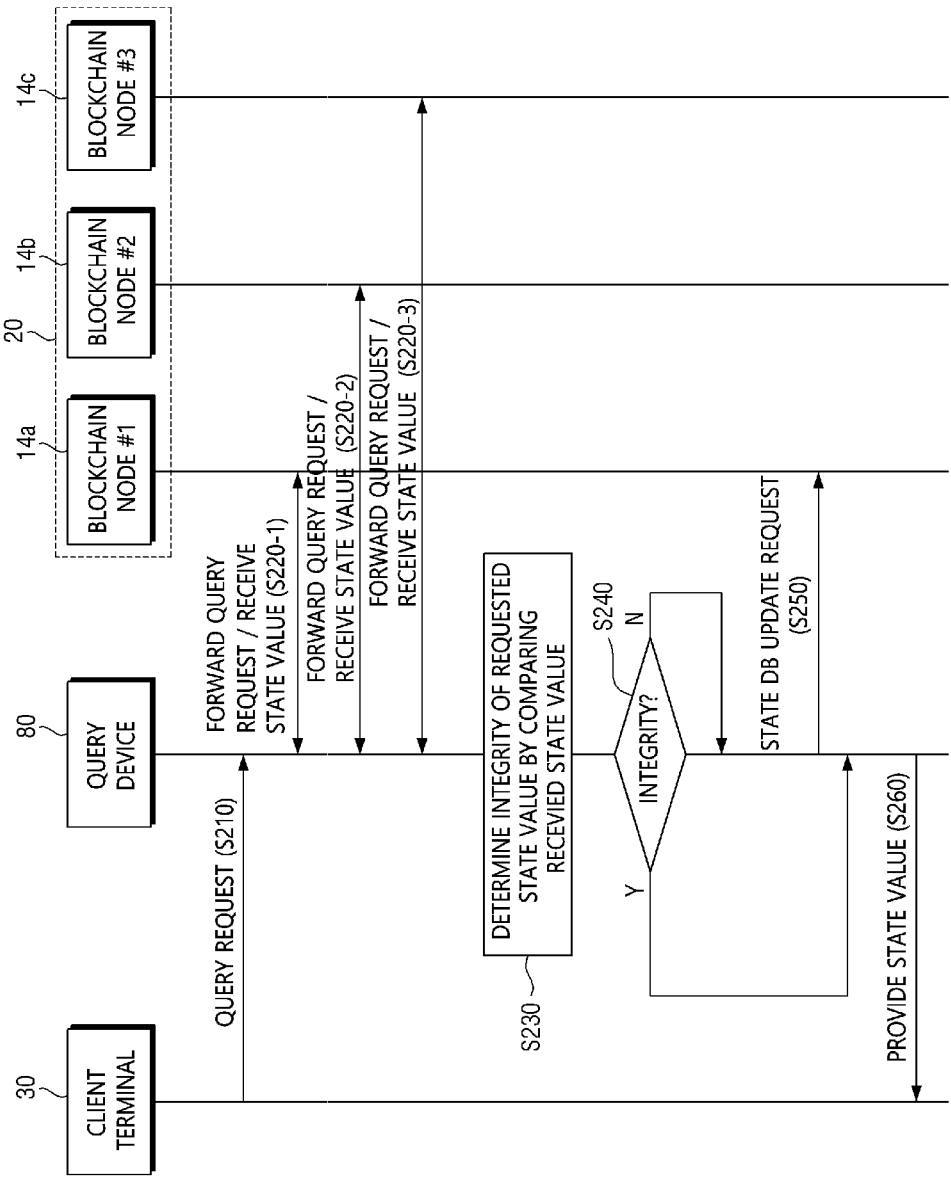
FIG. 10 is an exemplary flowchart for describing a method of guaranteeing the integrity of a state DB according to a fourth embodiment of the present disclosure.

FIG. 10 is an exemplary flowchart illustrating a method of guaranteeing the integrity of a DB according to a fourth embodiment of the present disclosure. However, this is merely an exemplary embodiment for achieving the purpose of the present disclosure, and some components may be added or deleted as necessary. For the sake of clarity, descriptions of overlapping contents with the foregoing embodiments will be omitted.

As shown in FIG. 10, the integrity guaranteeing method starts at step S210, in which the query device 80 receives a query request from a client terminal 30.

At steps S220-1 to S220-3, the query request may be forwarded to a plurality of blockchain nodes 14a to 14c, and a state value may be received from each of the plurality of blockchain nodes 14a to 14c (S220-1 to S220-3). In this case, the number of blockchain nodes that receive a query request and the number of received state values may vary according to the importance of the query request.

At steps S230 and S240, an integrity determination is performed based on the result of comparing a plurality of state values. For example, when there is a specific state value among a plurality of state values that is inconsistent with another state value, the specific state value may be determined to have no integrity. If the specific state value is determined to have no integrity, step S250 may be further performed.

At step S250, a state DB update is requested to a blockchain node (e.g., 14a) associated with the specific state value. For example, a status DB update request message may be sent to the blockchain node 14a. Further, the blockchain node 14a receiving the update request message may update its own state DB.

At step S260, a queried state value may be provided to the client terminal 30.

Figure 11:
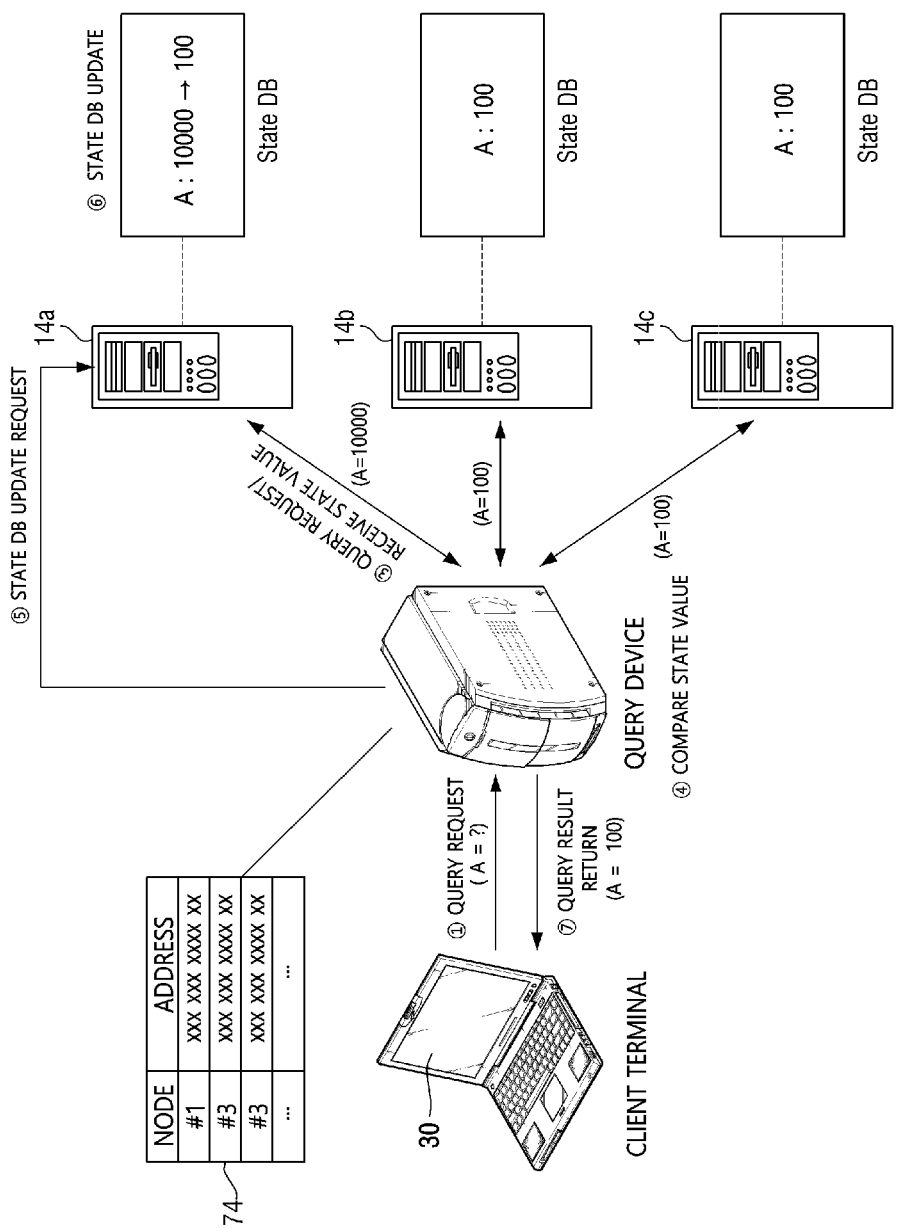
FIG. 11 is an exemplary diagram for further describing a method of guaranteeing the integrity of a state DB according to a fourth embodiment of the present disclosure.

Hereinafter, for convenience of understanding, the integrity guaranteeing method according to the fourth embodiment will be further described with reference to an example illustrated in FIG. 11. FIG. 11 shows an example, in which a state DB of a specific blockchain node 14a has been manipulated.

As shown in FIG. 11, a query device 80 may receive a plurality of state values from a plurality of blockchain nodes 14a to 14c and compares the plurality of state values (④) to determine that a state value of the specific blockchain node 14a (e.g., 10,000) has no integrity. In this case, the query device 80 may request the specific blockchain node 14a to update a state DB (⑤), and in response to the request, the specific blockchain node 14a may update its state DB (⑥). Accordingly, the integrity of a state DB can be guaranteed.

Further, the query device 80 may provide the client terminal 30 with a state value (e.g., 100), whose integrity has been verified. Accordingly, the reliability of a query result can be guaranteed.

So far, the method of guaranteeing the integrity of a state DB according to the fourth embodiment of the present disclosure has been described with reference to FIGS. 10 and 11. According to the above-described method, an integrity verification operation may be performed by using a separate query device 80 that does not belong to a blockchain network 20. Specifically, when a device having high reliability is used as the query device 80, a monitoring function for a blockchain node may be enhanced, and thus the reliability and security of the network 20 may be further improved.

Hereinafter, an exemplary computing device 100 that can implement component(s) (e.g., blockchain node 10, query device 80, integrity guaranteeing device) according to various embodiments of the present disclosure will be described with reference to FIG. 12.

Figure 12:
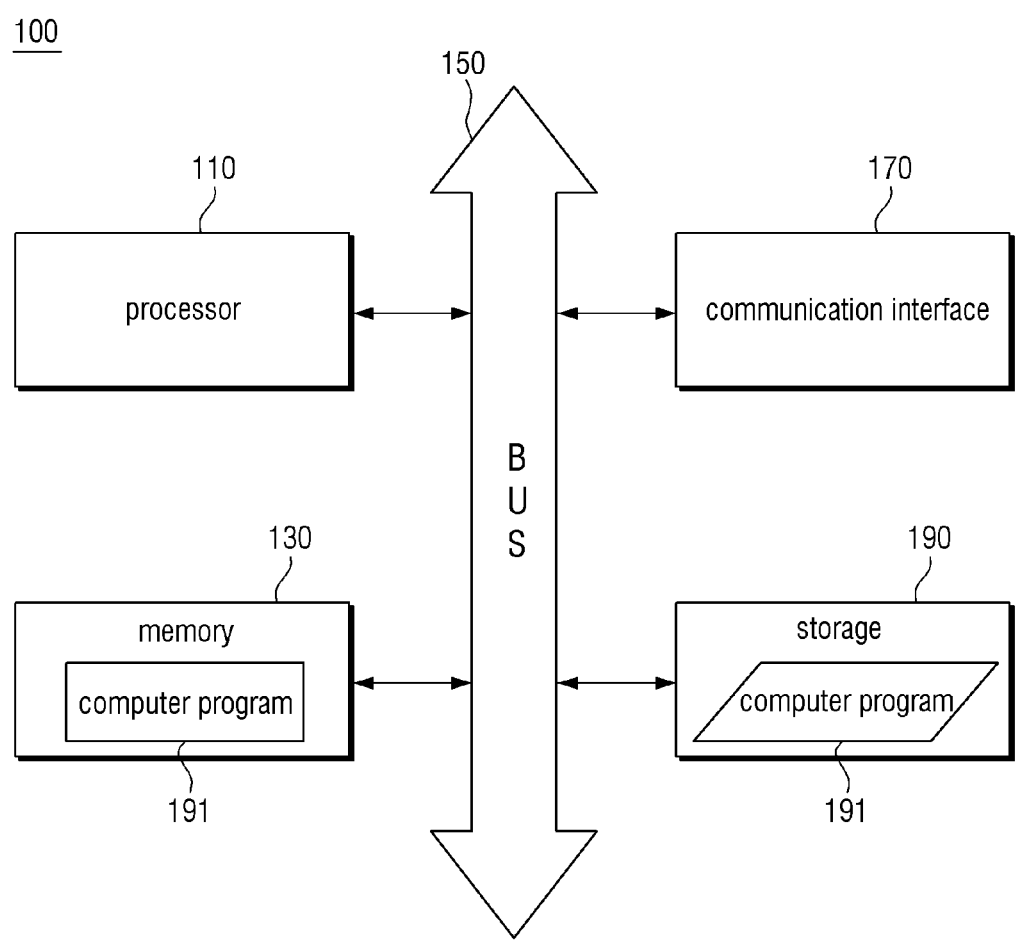
FIG. 12 is a diagram for illustrating an exemplary computing device that can implement components in accordance with one or more embodiments of the present disclosure.

FIG. 12 is a hardware diagram illustrating the example computing device 100.

As shown in FIG. 12, the computing device 100 may include one or more processors 110, a bus 150, a communication interface 170, a memory 130 that loads a computer program executed by the processor 110 and a storage 190 for storing a computer program 191. However, FIG. 12 illustrates only the components related to the embodiment of the present disclosure. Accordingly, those skilled in the art may understand that other general purpose components may be further included in addition to the components illustrated in FIG. 12, That is, the computing device 100 may further include various components in addition to the components illustrated in FIG. 12.

The processor 110 controls the overall operations of each component of the computing device 100. The processor 110 may be configured to include at least one of a central processing unit (CPU), a microprocessor unit (MPU), a micro controller unit (MCU), a graphics processing unit (GPU), or any type of processor well known in the art. Further, the processor 110 may perform calculations on at least one application or program to execute a method/operation according to various embodiments of the present disclosure. The computing device 100 may have one or more processors.

The memory 130 stores various data, commands and/or information. The memory 130 may load one or more programs 191 from the storage 190 to execute a method/operation according to the embodiments of the present disclosure. The memory 130 may be implemented as a volatile memory such as a RAM, but the technical scope of the present disclosure is not limited thereto.

The bus 150 provides a communication function between components of the computing device 100. The bus 150 may be implemented as various types of buses such as an address bus, a data bus, and a control bus.

The communication interface 170 supports wired and wireless internet communication of the computing device 100. Further, the communication interface 170 may support various communication methods other than internet communication. To this end, the communication interface 170 may be configured to include a communication module well known in the art of the present disclosure.

The storage 190 may non-temporarily store the one or more programs 191. The storage 190 may be configured to include a non-volatile memory, such as Read Only Memory (ROM), Erasable Programmable ROM (EPROM), Electrically Erasable Programmable ROM (EEPROM), Flash Memory, hard disks, removable disks, or any type of computer readable recording medium well known in the art.

The computer program 191 may cause the processor 110 to perform a method/operation according to various embodiments of the present disclosure when loaded on the memory 130, and may include one or more instructions. That is, the processor 110 may perform methods/operations according to various embodiments of the present disclosure by executing the one or more instructions.

For example, the computer program 191 may include instructions of performing operations of receiving a request to query for a state value, obtaining a first state value by querying a state database of the computing device in response to the request, forwarding the request to one or more blockchain nodes to receive a second state value from the one or more blockchain nodes and comparing the first state value with the second state value to determine the integrity of the requested state value. In this case, the blockchain node 10 or the state DB integrity guaranteeing device 10 according to some embodiments of the present disclosure may be implemented through the computing device 100.

For another example, the computer program 191 may include instructions of performing operations of receiving a request to query for a state value, forwarding the request to the plurality of blockchain nodes in response to the request, receiving a plurality of state values from the plurality of blockchain nodes and comparing the received plurality of state values to determine the integrity of a state value. In such a case, the query device 80 or the state DB integrity guaranteeing device 80 according to some embodiments of the present disclosure may be implemented through the computing device 100.

So far, various embodiments and effects thereof, in which the technical features of the present disclosure have been implemented, have been described with reference to FIGS. 1 to 12. Effects according to the technical features of the present disclosure are not limited to the above-described effects, and other effects not described will be clearly understood by those skilled in the art from the following description.

The technical features of the present disclosure described with reference to FIGS. 1 to 12 may be implemented as computer readable codes on a computer-readable medium. The computer-readable recording medium may be, for example, a removable recording medium (CD, DVD, Blu-ray disc, USB storage device, removable hard disk) or a fixed recording medium (ROM, RAM, computer equipped hard disk). The computer program recorded on the computer-readable recording medium may be transmitted to another computing device through a network such as Internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, it should not be understood that the operations must be performed in the specific order or sequential order shown, or that all the illustrated operations must be executed to achieve the desired results. In certain circumstances, multitasking and parallel processing may be advantageous. Moreover, the separation of the various configurations in the embodiments described above should not be understood as requiring that separation, and it should be understood that the described program components and systems may generally be integrated together into a single software product or packaged into multiple software products.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. An apparatus for guaranteeing integrity of a state database, the apparatus comprising:
   a memory for storing one or more instructions;

a communication interface for communicating with one or more blockchain nodes; and a processor configured, by executing the stored one or more instructions, to perform operations comprising:

receiving a request to query for a state value;

obtaining a first state value by querying a state database in response to the request;

forwarding the request to the one or more blockchain nodes to receive a second state value from the one or more blockchain nodes; and comparing the first state value with the second state value to determine integrity of the state value;

wherein the processor is further configured to:

receive importance value of the request along with the request; and determine the number of blockchain nodes to forward the request based on the received importance value.

2. The apparatus of claim 1, wherein the processor is further configured to update the first state value of the state database by using transaction data recorded in a blockchain, when it is determined that the first state value has no integrity.

3. The apparatus of claim 1, wherein the processor is further configured to rebuild the state database using transaction data recorded in a blockchain when it is determined that that the first state value has no integrity.

4. The apparatus of claim 1, wherein the processor is further configured to transmit a state database update request message to a blockchain node associated with the second state value when it is determined that the second state value has no integrity.

5. The apparatus of claim 1, wherein the processor is further configured to: forward the request to a plurality of blockchain nodes; receive one or more state values including the second state value from the plurality of blockchain nodes until a predetermined condition is satisfied; and compare the first state value with the received state value.

6. The apparatus of claim 5, wherein the predetermined condition includes a condition, in which a state value is received within a reference time.

7. The apparatus of claim 5, wherein the processor is further configured to receive importance value of the request along with the request; the predetermined condition includes a condition, in which a state value equal to or greater than a reference number is received; and the reference number is determined based on the importance value.

8. The apparatus of claim 1, wherein the processor is further configured to: receive a third state value from at least one blockchain node by requesting a state value to the at least one blockchain node as a predetermined condition is satisfied regardless of the request; perform integrity determination by comparing a fourth state value stored in the state database with the third state value; and update the fourth state value corresponding to the request within the state database when it is determined that the fourth state value has no integrity.

9. The apparatus of claim 8, wherein the predetermined condition includes a timer condition based on a predetermined period.

10. The apparatus of claim 8, wherein the predetermined condition includes a condition, in which a reliability score of the apparatus for guaranteeing integrity of the state database is equal to or less than a reference value; and the reliability score is determined based on the number of times the state database has been manipulated.

11. The apparatus of claim 1, wherein the processor is further configured to receive the second state value from a blockchain node having a reliability score equal to or greater than a reference value; and the reliability score is determined based on the number of times the state database of the blockchain node has been manipulated.

12. An apparatus for guaranteeing integrity of a state database, the apparatus comprising:

a memory for storing one or more instructions;

a communication interface for communicating with a plurality of blockchain nodes; and a processor configured, by executing the stored one or more instructions, to perform operations comprising:

receiving a request to query for a state value; forwarding the request to the plurality of blockchain nodes in response to the request;

receiving a plurality of state values from the plurality of blockchain nodes, and comparing the plurality of received state values to determine integrity of the state value;

wherein the processor is further configured to:

receive importance value of the request along with the request; and the number of the plurality of received state values is determined based on the importance value.

13. The apparatus of claim 12, wherein the processor is further configured to transmit a status database update request message to a blockchain node associated with a first state value when it is determined that the first state value among the plurality of state values has no integrity.

14. A method for guaranteeing integrity of a state database in a computing device, the method comprising:

receiving a request to query for a state value;

obtaining a first state value by querying a state database of the computing device in response to the request;

forwarding the request to one or more blockchain nodes to receive a second state value from the one or more blockchain nodes; and comparing the first state value with the second state value to determine integrity of the requested state value;

receiving importance value of the request along with the request; and determining the number of blockchain nodes to forward the request based on the received importance value.

* * * * *